United States Patent
Denning et al.

(10) Patent No.: US 11,576,526 B2
(45) Date of Patent: *Feb. 14, 2023

(54) UPPER PLATE ARRANGEMENT FOR CLAMSHELL GRIDDLE

(71) Applicant: ILLINOIS TOOL WORKS INC., Glenview, IL (US)

(72) Inventors: Kacy W. Denning, Charlotte, NC (US); Jairad M. Sloyer, Clover, SC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/005,861

(22) Filed: Aug. 28, 2020

(65) Prior Publication Data

US 2020/0390277 A1 Dec. 17, 2020

Related U.S. Application Data (63) Continuation of application No. 15/040,507, filed on Feb. 10, 2016, now Pat. No. 10,806,297.

(60) Provisional application No. 62/114,669, filed on Feb. 11, 2015.

(51) Int. Cl.
*A47J 37/06* (2006.01)

(52) U.S. Cl.
CPC .... *A47J 37/0611* (2013.01); *A47J 2037/0617* (2013.01)

(58) Field of Classification Search
CPC ............ A47J 37/0611; A47J 2037/0617; A47J 37/0676; A47J 37/0704; A47J 37/0688; A47J 37/128; A47J 37/00; A47J 37/041; A47J 37/047; A47J 37/067; A47J 37/0718; A47J 37/0786; A47J 37/0864; A47J 37/0871; A47J 43/18; A47J 27/14; A47J 36/12; A47J 36/022; A47J 36/32; A47J 36/38; A47J 2202/00; A47J 27/04; A47J 27/20; A47J 36/06; A47J 36/10; A47J 36/20; A47J 36/321; A47J 36/36; A47J 37/06; A47J 37/0892; A47J 37/1228; A47J 39/006

USPC ......... 99/379, 372, 378, 375, 374, 377, 400, 99/446, 422, 425, 423, 445, 385, 376, 99/389, 426, 390, 401, 403, 444, 448, 99/450, 380, 381, 391, 395, 402, 407, 99/409, 410, 419, 424, 449, 349, 353, 99/331, 340, 342, 330, 351, 332, 344, (Continued)

(56) References Cited

U.S. PATENT DOCUMENTS

| 4,913,040 A | 4/1990 | Sherman |
| 5,341,727 A | 8/1994 | Dickson |
| 5,473,976 A | 12/1995 | Hermansson |

(Continued)

FOREIGN PATENT DOCUMENTS

| CA | 130560 | 3/2010 |
| EP | 001034003-0001 | 11/2008 |
| EP | 001033997-0001 | 12/2008 |

*Primary Examiner* — Chris Q Liu
(74) *Attorney, Agent, or Firm* — Thompson Hine LLP (57) ABSTRACT

A griddle apparatus, includes a lower cooking plate and an upper cooking plate, where the upper cooking plate is mounted for movement relative to the lower cooking plate between a lower cooking position and an upper access position by a biasing arrangement that provides an upward force sufficient to move the upper cooking plate up to the upper access position once the upper cooking plate has been manually moved to a set raised location between the lower cooking position and the upper access position.

17 Claims, 10 Drawing Sheets

(58) Field of Classification Search
USPC ......... 99/355, 333, 334, 335, 337, 339, 343, 99/348, 350, 367, 393, 415
See application file for complete search history.

(56) References Cited

U.S. PATENT DOCUMENTS

| | | |
|---|---|---|
| 5,531,155 A | 7/1996 | Pellicane |
| 5,553,531 A | 9/1996 | Brown |
| 5,619,907 A | 4/1997 | Orgelmacher |
| 5,890,419 A | 4/1999 | Moravec |
| D598,709 S | 8/2009 | Scholz |
| D600,069 S | 9/2009 | Scholz |
| D605,467 S | 12/2009 | Scholz |
| 2009/0145304 A1 | 6/2009 | Yu |
| 2009/0308260 A1 | 12/2009 | Trost |
| 2010/0107894 A1 | 5/2010 | Scholz |
| 2010/0107895 A1 | 5/2010 | Scholz |
| 2010/0107896 A1 | 5/2010 | Scholz |
| 2010/0107897 A1 | 5/2010 | Scholz |
| 2010/0186601 A1 | 7/2010 | Gulkanat |

UPPER PLATE ARRANGEMENT FOR CLAMSHELL GRIDDLE

TECHNICAL FIELD

This application relates generally to clamshell griddle systems and, more specifically, to an upper plate arrangement for a clamshell griddle system.

BACKGROUND

Two-sided cooking (e.g., cooking with heat applied from griddle plate members both above and below the food product) generally reduces the overall cooking time and the amount of operator attention required for cooking the food products. Not only is cooking time dramatically reduced with two-sided cooking, but certain foods such as hamburgers, are improved in taste and texture by the application of force (e.g., a compressing of sandwiching type force) during the cooking process. Therefore, two-sided griddle-type cooking devices, also known as clam shell griddles, are highly desirable in fast food restaurants.

U.S. Patent Publication No. 2010/0186601 is representative of a previously known clam shell griddle with a pivoting upper griddle plate, a biasing arrangement and a locking assembly to lock the upper plate in certain positions, which locking assembly can be released by moving a handle part. However, improvements are regularly sought.

It would be desirable to provide an upper griddle mechanism adaptable to existing product lines and facilitating ease of operator use.

SUMMARY

In one aspect, a griddle apparatus, includes a lower cooking plate and an upper cooking plate, where the upper cooking plate is mounted for movement relative to the lower cooking plate between a lower cooking position and an upper access position by a biasing arrangement that provides an upward force sufficient to move the upper cooking plate up to the upper access position once the upper cooking plate has been manually moved to a set raised location between the lower cooking position and the upper access position.

In another aspect, a griddle mechanism includes a support column and an arm assembly pivotally connected to the support column for pivot about a first fixed pivot axis, where the arm assembly carries a griddle plate. A linkage arrangement is provided within the support column and includes a lower linkage and an upper linkage. A lower end of the lower linkage pivots about a second fixed pivot axis, an upper end of the upper linkage pivots about the first fixed pivot axis, and a lower end of the upper linkage and an upper end of the lower linkage both pivot about an intermediate pivot axis that is movable.

In a further aspect, a griddle mechanism includes a support column and an arm assembly pivotally connected to the support column for pivot about a first fixed pivot axis, where the arm assembly carries a griddle plate. A biased linkage arrangement is provided within the support column and includes a lower linkage and an upper linkage pivotally connected to each other at a moving pivot axis, where the lower linkage comprises a biasing member exerting a biasing force toward the intermediate pivot axis so as to cause the upper linkage to exert a rotational force about the first fixed pivot axis that urges the arm assembly to pivot about the fixed pivot axis.

The details of one or more embodiments are set forth in the accompanying drawings and the description below. Other features, objects, and advantages will be apparent from the description and drawings, and from the claims.

DETAILED DESCRIPTION

Figure 1:
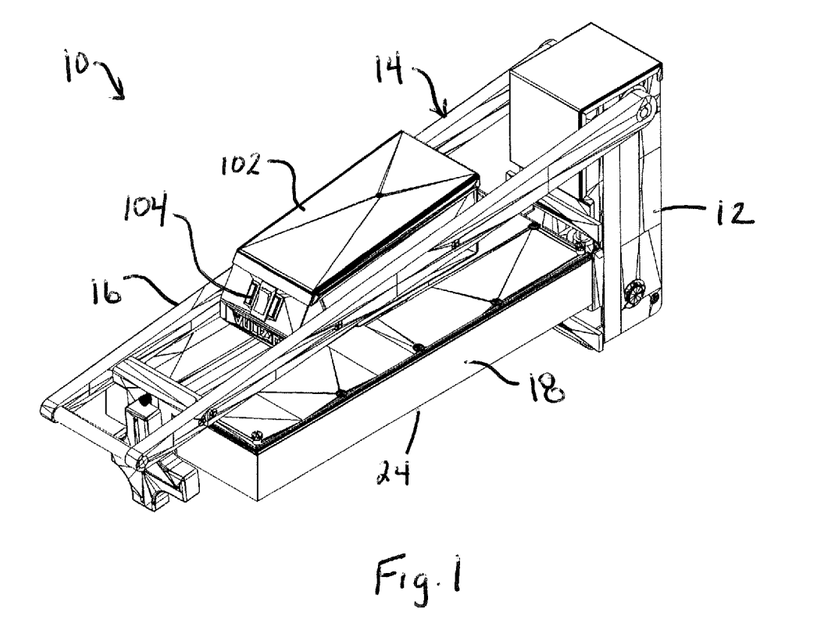
FIG. 1 is a perspective view of an upper griddle mechanism.

Referring to FIG. 1, a perspective view of one embodiment of an upper griddle mechanism 10 is shown. The upper griddle mechanism 10 includes an upright mount column 12 (aka a support column) and an arm assembly 14 pivotally connected to the mount column. The arm 14 includes an arm body or frame 16 and an upper griddle plate assembly 18 connected to an underside of the arm body 16. The connecting joint between the arm body 16 and the griddle plate assembly 18 may be a universal type joint that enables the griddle plate assembly to pivot and/or float relative to the arm body. The exact structure of the griddle plate assembly may vary, but the griddle plate assembly generally includes a lower, heated (e.g., heated by one or more resistive elements insides the assembly) cooking surface 24 that can rest atop food product for cooking the food product. A control box 102 is located on the arm assembly 14 and includes internal circuitry and/or other components (e.g., electrical controls and components such as thermostat, high-limit sensors, control switches 104, lights, etc.), to enable suitable control of the heating of the upper griddle plate.

Figure 2:
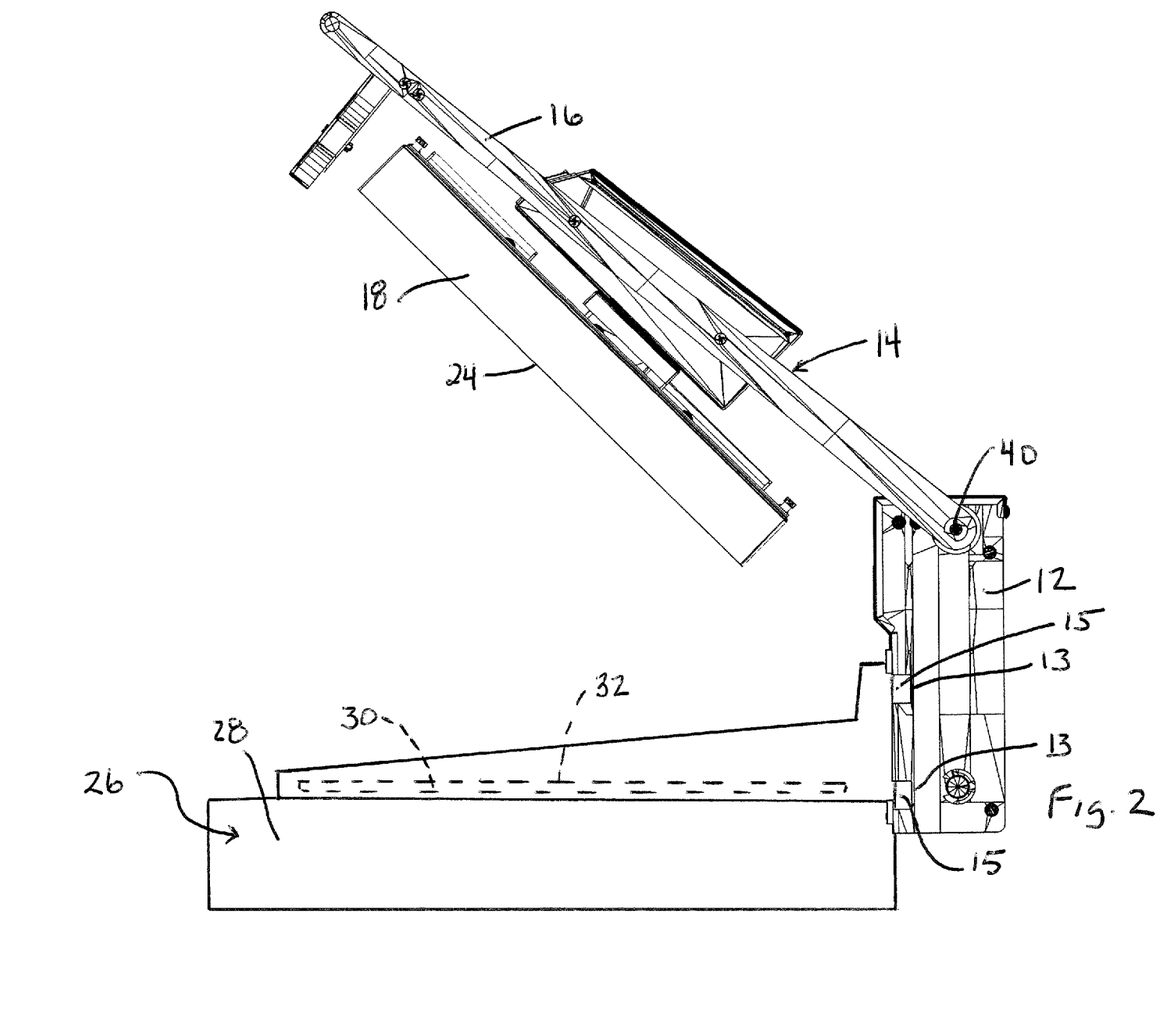
FIG. 2 is a side elevation of an exemplary griddle apparatus including the griddle mechanism of FIG. 1 with the griddle arm in an upper access position.
Figure 3:
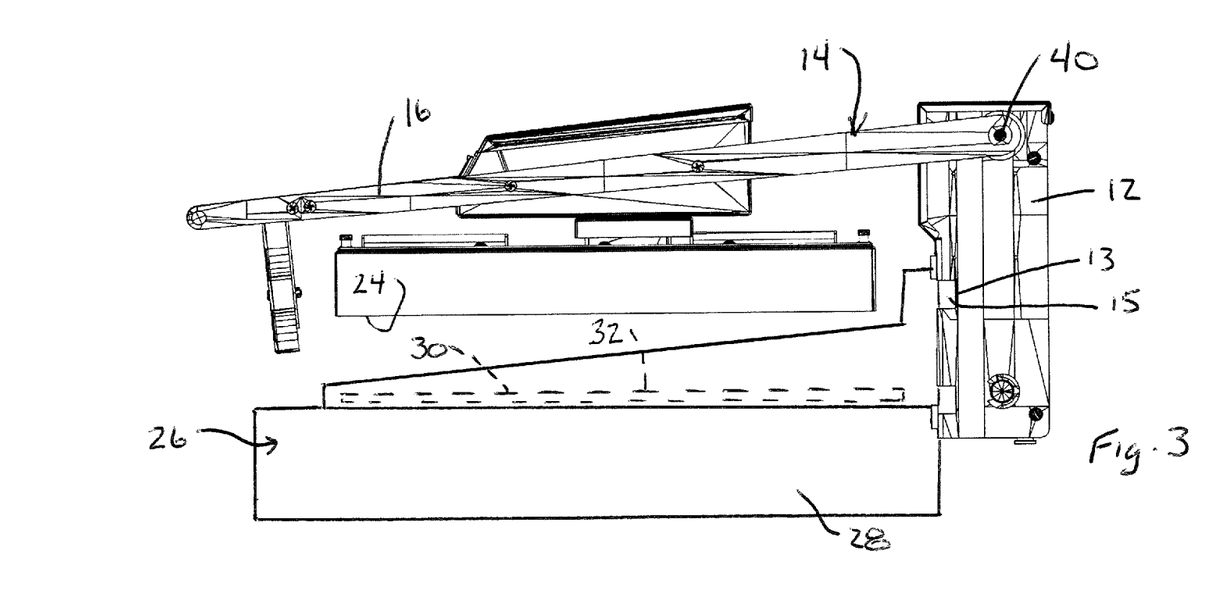
FIG. 3 is a side elevation of an exemplary griddle apparatus including the griddle mechanism of FIG. 1 with the griddle arm in an lower cooking position.

Referring to FIGS. 2 and 3, the upper griddle mechanism is shown mounted to an exemplary griddle apparatus 26 having a griddle body 28 and a griddle plate 30 with an upwardly facing cooking surface 32. The upper griddle mechanism is intended for use with a variety of cooking griddle apparatus, including counter top size griddle apparatus as shown, as well as standard size griddle apparatus (e.g., griddles having a body/frame sized for placement on the floor of a cooking environment). The mount column 12 is used to secure the upper griddle mechanism to the griddle apparatus at the rear side of the griddle body/frame, but could be secured to the griddle/apparatus body/frame at other locations, such as the left or right side.

In the illustrated embodiment, the body of the mount column 12 includes slots 13 that face toward the rear side of the griddle body and into which square mount brackets 15 are positioned. The square mount brackets may be secured to the griddle apparatus utilizing a pair of L-shaped brackets that are secured to each side of the griddle apparatus at the rear corners (e.g., using machine screws), with the mount brackets 15 extending laterally between the two L-shaped brackets. The interaction of the mount brackets and slots provided increased stability to the mount connection. Fasteners may be used to further secure the mount column to the rear panel of the griddle apparatus. Of course, other mount arrangement could be used in connection with the upper griddle mechanism.

As shown, the arm assembly 14 is pivotable about an axis 40 that is fixed relative to the mount column 12 for movement between a lowered cooking position (FIG. 3) and a raised non-cooking position (FIG. 2). The mount column 12 is mounted to the cooking apparatus 26 and extends above the upwardly facing surface griddle surface 32. When the arm 14 is in the cooking position the lower cooking surface 24 of the upper griddle plate 22 opposes the upwardly facing cooking surface 32 of the lower griddle plate so that food items can be heated and cooked from both above and below by the two heated surfaces. When the arm 14 is in the raised non-cooking position food items can removed from or placed on the lower griddle plate 30, or otherwise manipulated on the griddle plate 30.

Figure 4:
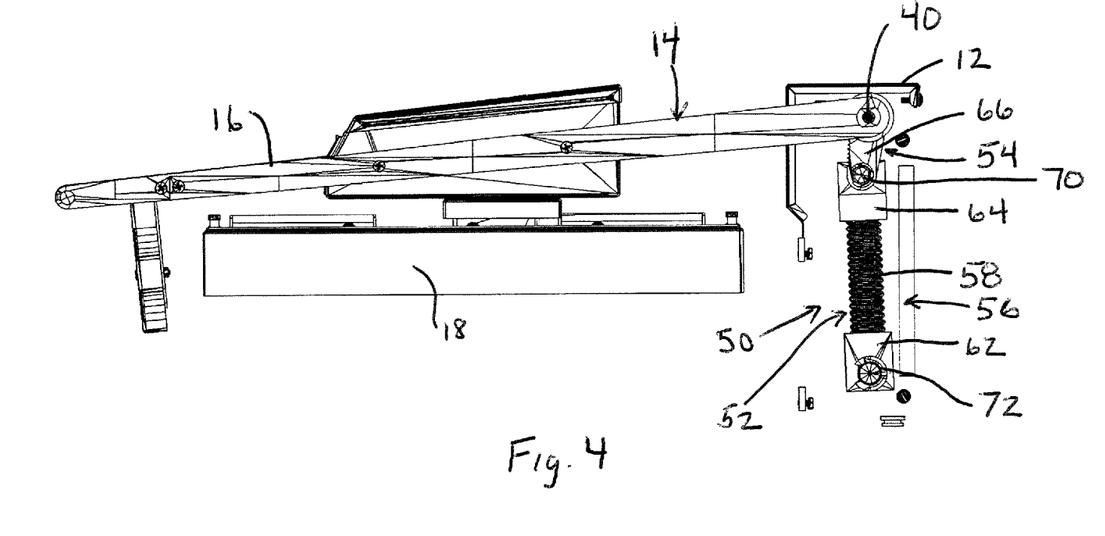
FIG. 4 is a side elevation of the griddle mechanism with mount column housing removed.
Figure 5:
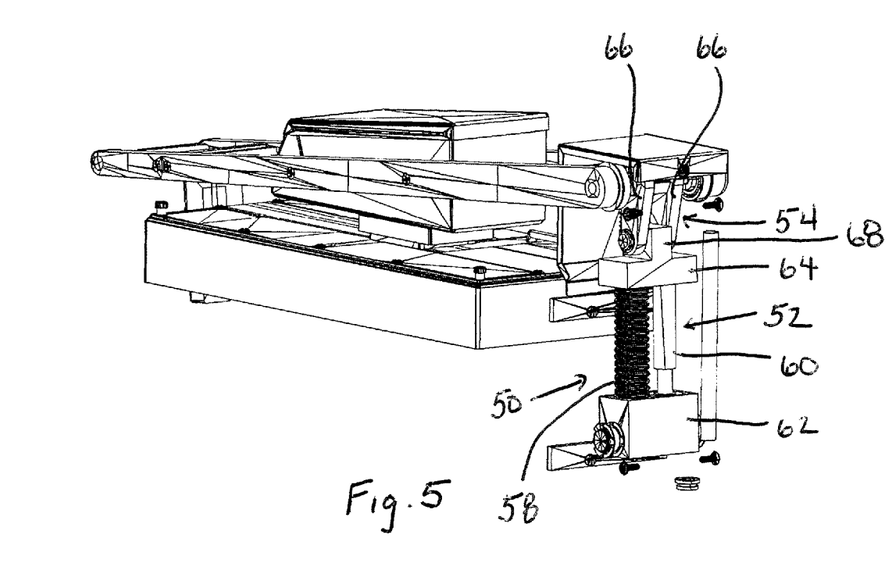
FIG. 5 is a perspective view of FIG. 4.

Referring now to FIGS. 4 and 5, where a housing portion of the mount column is not shown, an biasing assembly 50 is provided between the arm portion 14 and the mount column 12. Specifically, the biasing assembly includes a linkage arrangement formed by a lower linkage 52 and an upper linkage 54. The lower linkage 52 is in the form of one or more biasing members 56. Here two side-by-side biasing members 56 in the form of springs 58 are used, each spring 58 being disposed about a telescoping guide member 60 that extends between a lower spring bias block or cap 62 and an upper spring bias block or cap 64, each of which may include recesses to receive and retain the ends of the springs 58. Thus, the length of the lower linkage 52 can vary depending upon the orientation of the linkage arrangement. By contrast, the upper linkage 54 is of fixed length, and here is in the form of two side-by-side pitman arms 66 at opposed sides of a raised mid-section 68 of the upper block 64. A pivot pin may extend through the raised mid-section 68 so that the arms 66 can pivot relative to the upper block 64 about a pivot axis 70.

Figure 6:
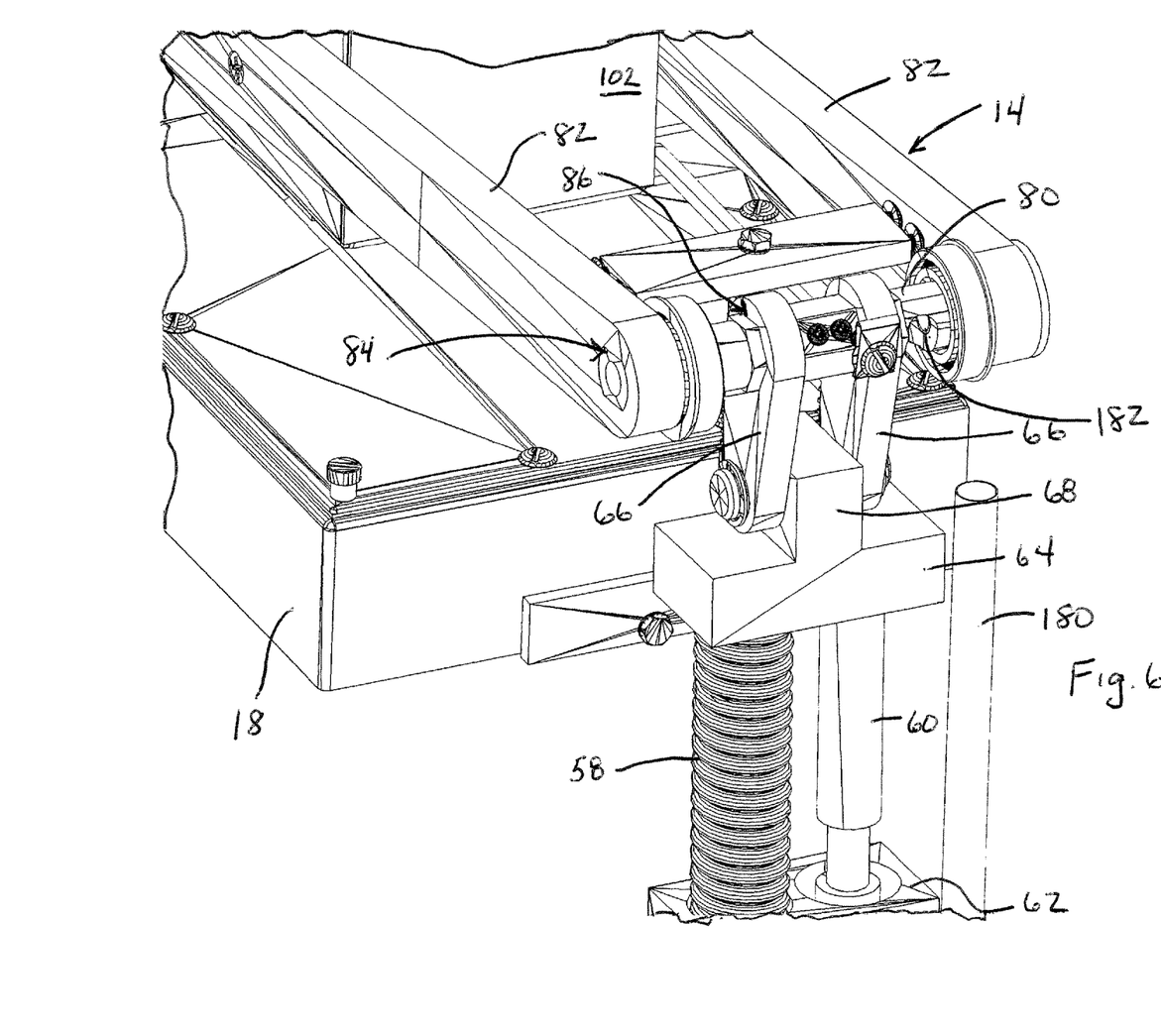
FIG. 6 is a partial view of FIG. 5.

The lower linkage is pivotable by way of a pivotable mount of the lower block 62 to the mount column housing, where the pivot axis 72 of the lower block 62 has a fixed position on the mount column 12. As previously noted, the pivot axis 40 of the arm assembly 14 also has a fixed position on the mount column 12. In addition, the arm assembly 14 and the upper linkage 54 are interconnected so that there is no relative pivot between the two. In the illustrated embodiment, as best seen in FIG. 6, this fixed relative orientation between the arm assembly 14 and the upper linkage 54 is achieved by the use of a pivot shaft 80 that has end portions keyed to the side rails 82 of the arm assembly frame 16 as indicated at 84 (e.g., using a D-shaped connection, double-D shaped connection or any other suitable non-rotating connection between the ends of the pivot shaft and the shaft receiving openings in the side rails 82). The pivot shaft 80 also has a non-rotating connection to the upper ends of the pitman arms 66 as indicated at 86 (e.g., here by using a hex shape on the shaft that engages hex openings on the arms 66).

Figure 7:
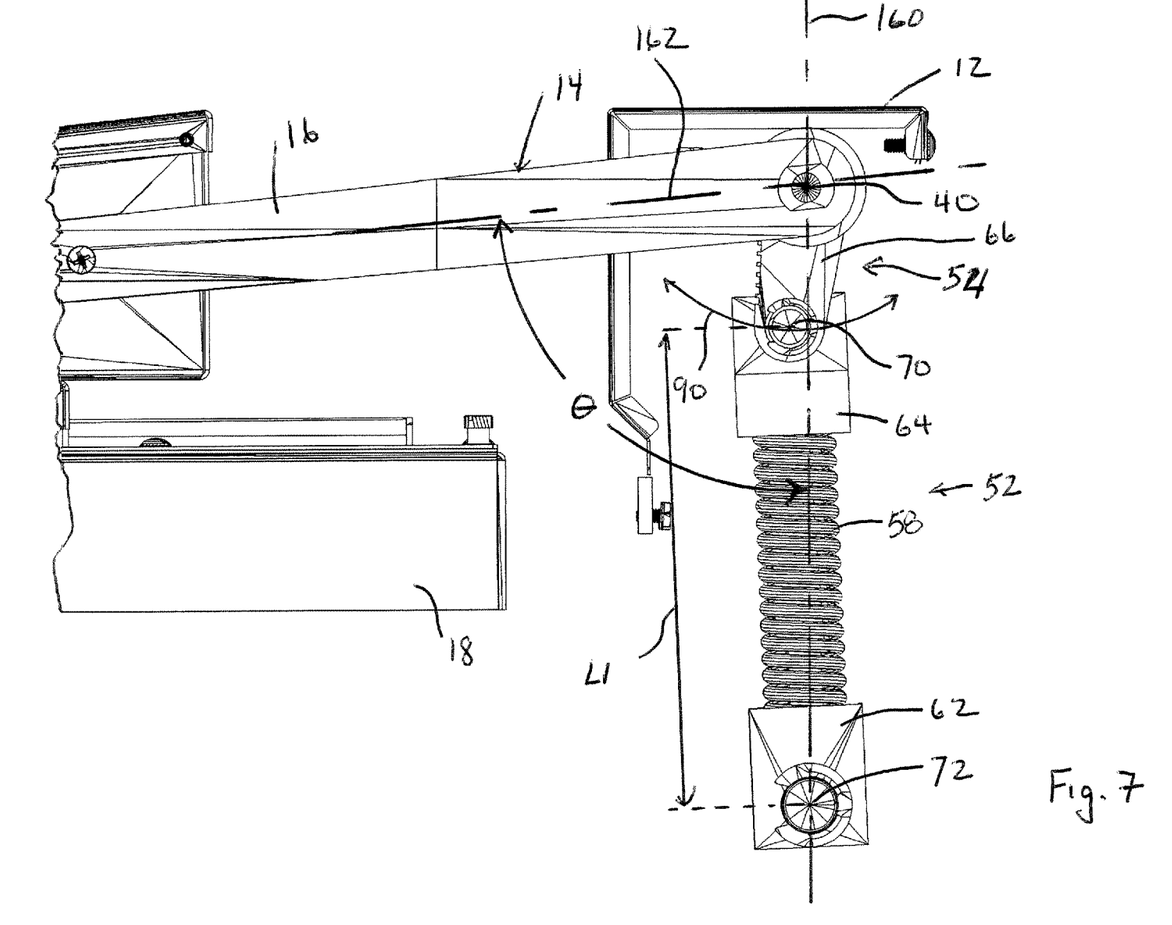
FIG. 7 is a partial side elevation of the griddle mechanism with arm assembly in the lower cooking position and mount column housing removed.
Figure 8:
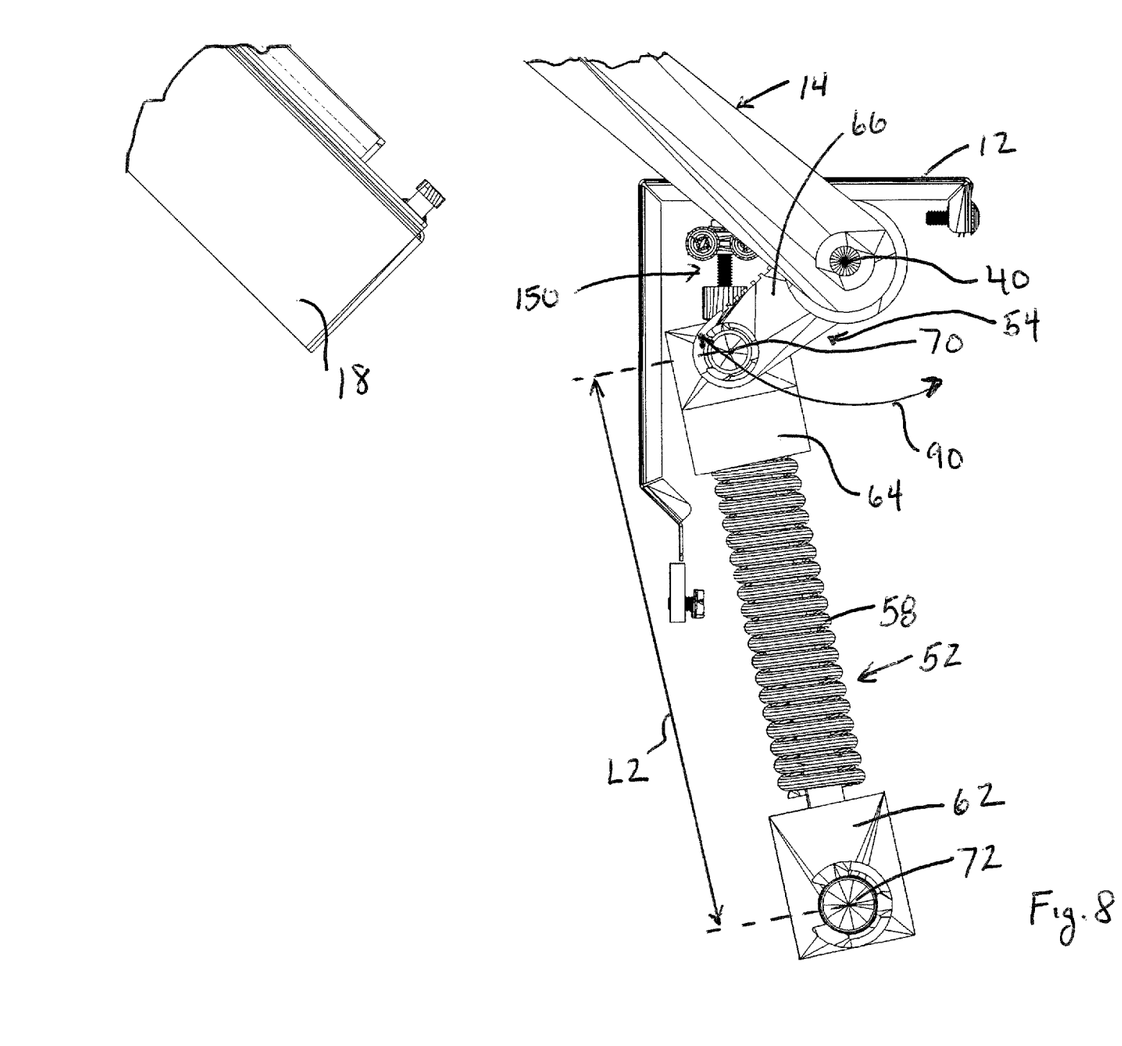
FIG. 8 is a partial side elevation of the griddle mechanism with arm assembly the upper access position and mount column housing removed.

Referring to FIGS. 7 and 8, with the above arrangement, including the fixed locations of pivot axis 40 and pivot axis 72, as the arm assembly 40 is pivoted relative to the mount column 12, the upper linkage 54 will also pivot about axis 40, causing the location of the pivot axis 70 to move in an arc about pivot axis 40 as indicated by path 90. This in turn causes the length of the lower linkage 52 to pivot about axis 72, and also causes the length of the lower linkage 52 to change during such pivot, such that when the arm assembly 14 is in the lowered cooking position the linkage length L1 (FIG. 7) is smaller than the linkage length L2 (FIG. 8) when the arm assembly is in the raised non-cooking position. Utilizing this biased linkage arrangement, advantageous functional operation of the mechanism can be achieved.

As a starting point, note that the size of the torque created by the weight of the arm assembly 14 about the pivot axis 40, which tends to move the arm assembly downward (e.g., counterclockwise about the pivot axis 40 in the views of FIGS. 7 and 8) will vary, generally becoming smaller as the arm assembly 14 moves upward toward the raised non-cooking position because the lever arm size becomes smaller as the arm assembly 14 is raised. Thus, the higher the arm assembly 14 is raised, the less force, or counter-torque, required to maintain the arm assembly 14 in that raised position.

The springs 58 are compressed between the lower block 62 and the upper block 64 to provide a bias that tends to urge the length of the lower linkage 52 to increase. The compression of the springs 58 is maintained throughout the operational range of movement of the arm assembly 14, so that the bias provided by the lower linkage is always in the same orientation, along the axial length of the lower linkage and toward the moving pivot axis 70. The bias of the lower linkage 52 is applied to the upper linkage, which acts as a lever arm about pivot axis 40. Depending upon the position of the pivot axis 70 along the arcuate path 90, the size of the lever arm will vary, such that the applied torque (Bias Force×Lever Arm Length) will also vary. In some implementations the direction of the applied torque about the pivot axis 40 can also vary, if desired.

Figures 9A, 9B:
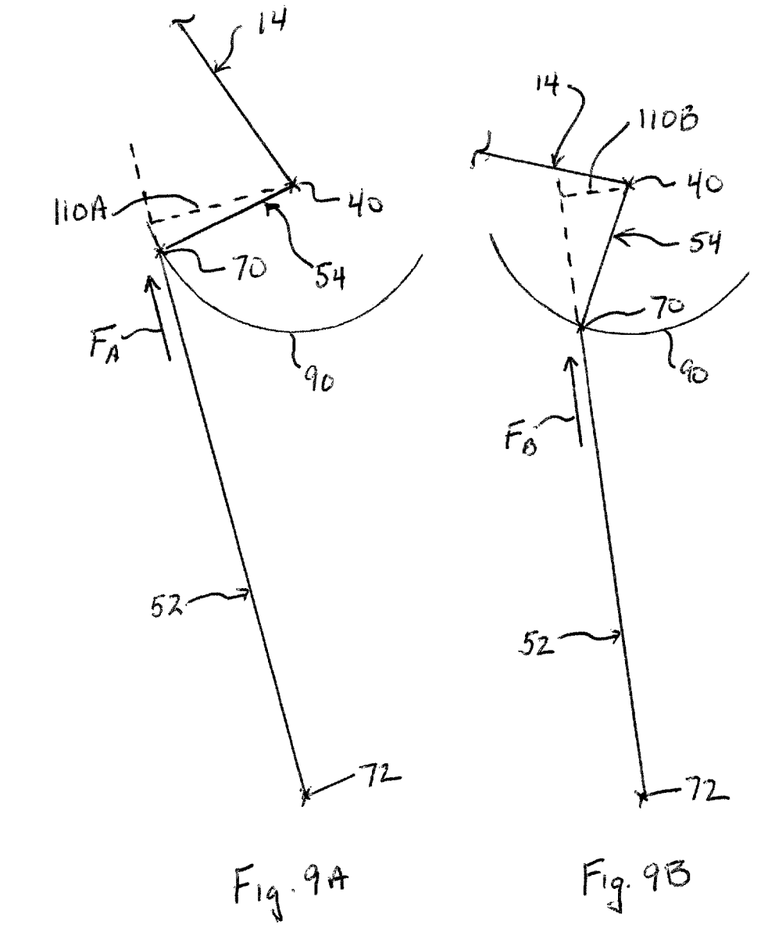
FIGS. 9A-9C are schematic depictions of the linkage arrangement of the griddle mechanism in various positions.
Figure 9C:
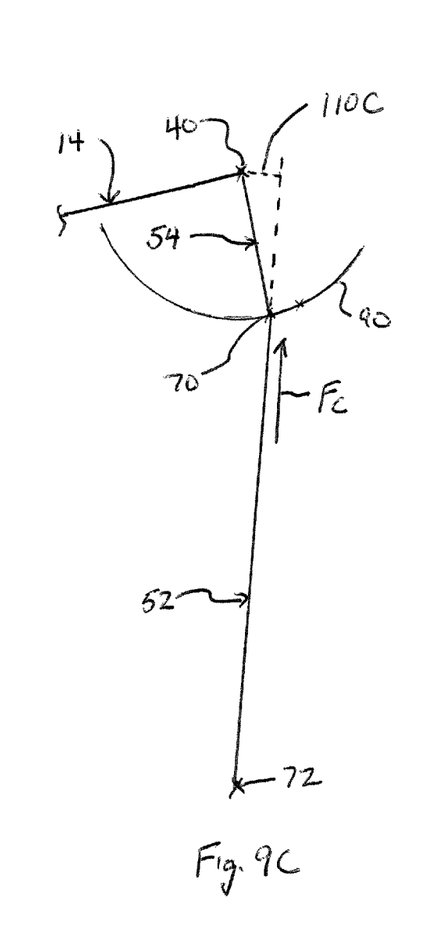

By way of example, reference is made to the series of schematic views in FIGS. 9A-9C, which represent different orientations of the linkage arrangement 52, 54 and the corresponding orientations of the arm assembly 14. In each case, the pivot axes 72 and 40 are fixed locations, and the location of the pivot axis 70 along its path 90 has changed. In FIG. 9A, the arm assembly 14 is raised upward and in FIG. 9B the arm assembly 14 is in a lower position. The size of the lever arm 110A in the orientation of FIG. 9A is relatively large as compared to the size of the lever arm 110B in the orientation of FIG. 9B, resulting in a larger clockwise torque in the orientation of FIG. 9A then the clockwise torque in the orientation of FIG. 9B, it being understood that although the biasing force $F_B$ applied by linkage 52 in the orientation of FIG. 9B will be larger (than biasing force $F_A$) due to greater compression of the springs (not shown), the springs are selected so that this force difference is not sufficient to counteract the difference in the size change of the lever arm.

The linkage arrangement can, therefore, be advantageously configured such that a break over point exists in the movement range of the arm assembly 14, where the applied clockwise torque of the linkage arrangement overcomes the counterclockwise torque of the weight of the arm assembly 14. It is noted here that the references to clockwise and counterclockwise are specific to the side view orientation shown in FIGS. 7, 8 and 9A-9C, and a broader manner of stating the situation is that at the break over point the upward or raising force applied by the linkage arrangement to the arm assembly 14 will overcome the gravitationally induced downward or lowering force applied to the arm assembly. Thus, once the arm assembly 14 is raised to the break over point by an operator, the arm assembly 14 can be released by the operator and the arm assembly 14 will remain up the need for any lock or latching mechanism and, in fact, the arm assembly 14 will continue to move upward to its full up position.

In this regard, the full up position may be adjustable according to a stop assembly 150 (FIG. 8) at the top of the mount column 12. In the illustrated embodiment the stop assembly 150 includes a bumper 152 mounted on a threaded shaft 154 that is attached to a mount bracket 156, such that rotation of the bumper and shaft 154 varies the height of the bumper (e.g., where the shaft 154 is threaded into the bracket 156) or such that rotation of the bumper alone varies the height of the bumper (e.g., where the shaft 154 is stationary and the bumper 152 is threadedly connected to the shaft 154). The bumper 152 interacts with a top portion of the upper block 64 to limit the permitted rotational movement of the upper linkage 54 (limited in the clockwise direction in the view of FIG. 8). In addition, the telescoping guide members 60 may be implemented as dampers that act to dampen the upward movement of the arm assembly 14 after release by an operator above the break over point (as well as dampen downward movement of the arm assembly 14 under gravity if released by an operator below the break over point). Alternatively, some other dampening arrangement could be provided.

Figure 10A:
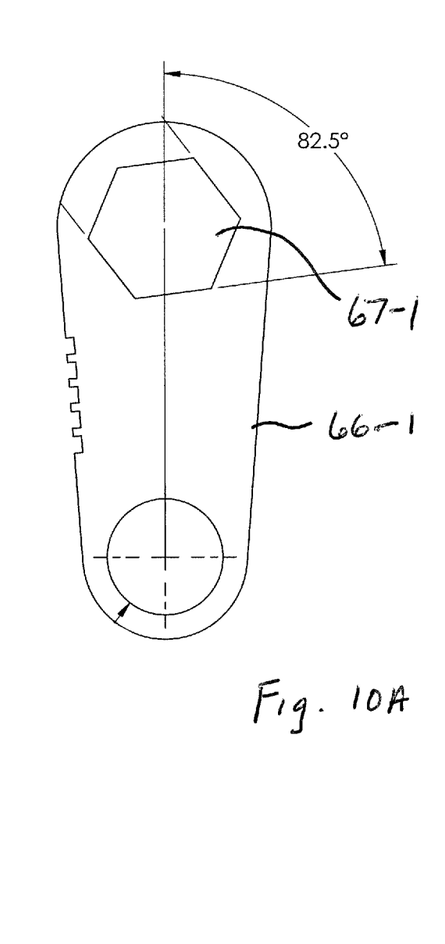
FIGS. 10A and 10B show alternative configurations of the arms of the upper linkage.
Figure 10B:
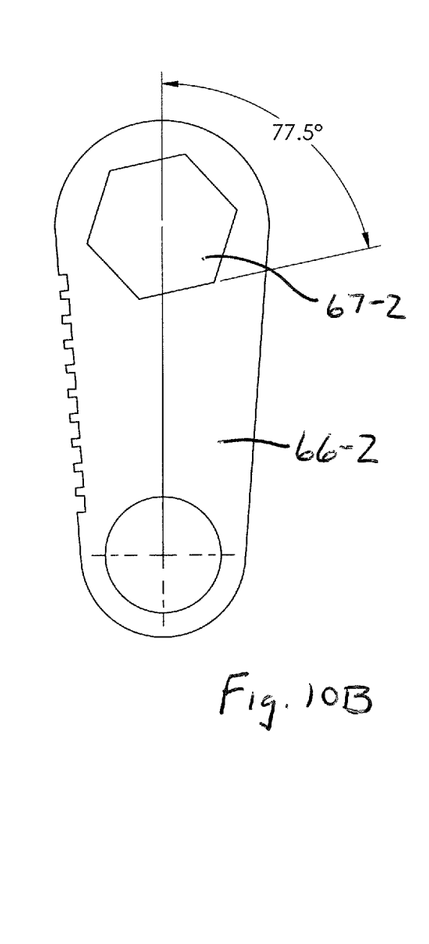

With respect to the break over point discussed above, it is recognized that the exact position of the break over point can vary as needed for a given application, or based upon desires of particular operators, and that simply varying the particular relative size and orientation of one or more of the linkages can be used to achieve desired break over points. For example, referring to FIGS. 10A and 10B, a slight change, in the orientation of the hex opening in the pitman arm can be used to vary the break over point, where pitman arm 66-1 includes a hex opening 67-1 offset at 82.5 degrees from the axis of the arm, and pitman arm 66-2 includes a hex opening 67-2 offset at 77.5 degrees from the axis of the arm. Numerous other configurations (e.g., offset angles) could be applied depending upon desired break over point.

Referring again to FIG. 7, where a relative angle Θ between the arm assembly 14 and vertical (here represented by axis 160 that happens to pass through both pivot axis 40 and pivot axis 72) is defined by an elongated axis 162 of the arm assembly frame 16 passing through the pivot point 40, it is generally contemplated that be break over point may be defined by an angle Θ in the range of between about 110 degrees and about 130 degrees (e.g., between about 115 degrees and about 125 degrees). However, other break over points are contemplated and possible. Moreover, as another basis for comparison, the break over point may simply a raised location with a set degree of pivot (e.g., in a range of about 10 to 30 degrees, such as about 15 to 25 degrees) above the lowered cooking position.

Referring again to FIG. 9C, it is seen that in some arrangements the linkage arrangement may be configured to enable the biasing force $F_c$ to act with a lever arm 110C to create a torque that will tend to urge the arm assembly 14 downward (a counterclockwise torque in this view). The downward bias could be helpful to a certain degree in some cooking application by providing an additional compression effect (in addition to that caused by gravity) to the cooking process. However, it is contemplated that in many implementations the downward bias need not be used.

As seen in FIG. 6 a wire routing tube 180 may be provided within the column, and the pivot shaft 80 may include an opening 182 to enable routing of the wiring into and within the shaft 80 to reach the rail 82, which may have a recessed channel at its underside to provide a wire path to the control box 102.

It is to be clearly understood that the above description is intended by way of illustration and example only, is not intended to be taken by way of limitation, and that other changes and modifications are possible.

The invention claimed is:

1. A griddle apparatus, comprising:
a lower cooking plate; and
an upper cooking plate, the upper cooking plate mounted on an arm assembly, the arm assembly movable between a lower cooking position and an upper access position;
a biasing assembly that includes a lower linkage pivotably connected to an upper linkage at a first pivot axis, the lower linkage comprising at least one spring, the upper linkage connected to the arm assembly at a second pivot axis, wherein the biasing assembly is configured such that the biasing assembly provides an upward force sufficient to move the arm assembly up to the upper access position once the arm assembly has been manually moved to a set raised location between the lower cooking position and the upper access position;
wherein, when the arm assembly is in the lower cooking position, the first pivot axis is located lower than the second pivot axis, and, when the arm assembly is in the upper access position, the first pivot axis is located lower than the second pivot axis.

2. The griddle apparatus of claim 1, wherein the arm assembly is mounted for pivoting movement about the second pivot axis between the lower cooking position and the upper access position, and the set raised location is defined by a set degree of pivot from the lower cooking position toward the upper access position.

3. The griddle apparatus of claim 1, wherein a lower end of the lower linkage pivots about a lower fixed pivot axis, the second pivot axis is a fixed pivot axis, and the first pivot axis moves during movement of the arm assembly.

4. The griddle apparatus of claim 3, wherein a length of the upper linkage is fixed, and a length of the lower linkage varies as the first pivot axis moves.

5. The griddle apparatus of claim 4, wherein the lower linkage further comprises a telescoping guide shaft assembly about which the at least one spring is disposed.

6. The griddle apparatus of claim 1, wherein the arm assembly includes at least one pivoting arm, wherein the pivoting arm has a keyed, non-circular opening fitted on to a similarly shaped keyed, non-circular portion of a pivot shaft assembly.

7. The griddle apparatus of claim 6, wherein the upper linkage is connected to rotate the non-circular pivot shaft assembly, the upper linkage having a keyed, non-circular opening fitted on to a similarly shaped keyed, non-circular portion of the pivot shaft assembly.

8. The griddle apparatus of claim 1, wherein the biasing assembly holds the arm assembly in the upper access position without requiring any locking arrangement.

9. The griddle apparatus of claim 1, wherein the biasing assembly also provides a downward force to the arm assembly when in the lower cooking position.

10. A griddle apparatus, comprising:
a lower cooking plate; and
an upper cooking plate, the upper cooking plate mounted on an arm assembly, the arm assembly mounted for pivoting movement, relative to the lower cooking plate and about a first pivot axis, between a lower cooking position and an upper access position;
a biasing assembly including a lower linkage with at least one spring, the lower linkage pivotably connected to an upper linkage at a second pivot axis, the upper linkage pivotably connected to the first pivot axis, wherein the biasing assembly provides a rotational bias on the arm assembly, wherein the biasing assembly is configured such that, as the arm assembly is manually moved from the lower cooking position toward the upper access position, once the arm assembly reaches a set raised location between the lower cooking position and the upper access position, the rotational bias provides a force sufficient to move the arm assembly up to the upper access position.

11. The griddle apparatus of claim 10, when the second pivot axis is located lower than the first pivot axis both when the arm assembly is in the lower cooking position and when the arm assembly is in the upper access position.

12. The griddle apparatus of claim 10, wherein the set raised location is at an arm assembly angle of between ten degrees and thirty degrees above the lower cooking position.

13. A griddle apparatus, comprising:
an upper cooking plate, the upper cooking plate mounted on an arm assembly, the arm assembly pivotable about a first pivot axis over a movement range between a lower cooking position and an upper access position, wherein, over the movement range, a weight of the upper cooking plate and the arm assembly applies a first rotational torque in a first direction about the first pivot axis urging the arm assembly down toward the lower cooking position;
a biasing assembly that includes a lower linkage pivotably connected to an upper linkage at a second pivot axis, the lower linkage comprising at least one spring, the upper linkage connected for pivot about the first pivot axis, wherein the biasing assembly is configured to apply, over at least part of the movement range, a second rotational torque in a second direction about the first pivot axis, the second rotational torque urging the arm assembly up toward the upper cooking position, wherein the biasing assembly is further configured such that a break over point exists along the movement range between the lower cooking position and the upper access position such that, as the arm assembly is moved from the lower cooking position toward the upper access position, once the arm assembly reaches the break over point, the applied second rotational torque in the second direction overcomes the applied first rotational torque in the first direction such that the applied second rotational torque is sufficient to continue raising the arm assembly up into the upper access position;
wherein the break over point is located at an arm assembly angle of between ten degrees and thirty degrees above the lower cooking position.

14. The griddle apparatus of claim 13 wherein the first pivot axis is fixed, wherein a lower end of the lower linkage pivots about a third pivot axis that is fixed, wherein the second pivot axis moves during pivot of the arm assembly.

15. The griddle apparatus of claim 14, wherein a length of the upper linkage is fixed, and a length of the lower linkage varies as the intermediate pivot axis moves.

16. The griddle apparatus of claim 15, wherein the at least one spring comprises at least one compression spring disposed about a telescoping guide shaft assembly.

17. The griddle apparatus of claim 13, wherein the second rotational torque is sufficient to hold the upper cooking plate in the upper access position without requiring any locking arrangement.

* * * * *